United States Patent Office 2,961,376
Patented Nov. 22, 1960

2,961,376

HEMOSTATIC COMPOSITION

Desider Fleischhacker, New York, and Norman Barsel, Laurelton, N.Y., assignors to International Hormones, Inc., Brooklyn, N.Y., a corporation of New York No Drawing. Filed June 14, 1955, Ser. No. 515,532

9 Claims. (Cl. 167—65)

The present invention relates to certain novel hemostatic compositions and to a process for the production thereof.

More particularly, the present invention relates to hemostatic compositions comprising a combination of certain adrenochrome derivatives and non-toxic, injectible water soluble salts and to a process for preparing these compositions.

In our United States Patent No. 2,581,850, issued January 8, 1952, there is disclosed certain combinations of sodium salicylate and adrenochrome derivatives, namely, the semicarbazone and the oxime, whch are especially desirable therapeutics for the relief of certain types of bleeding. As pointed out in the aforementioned patent, the combination of at least 25 parts of sodium salicylate to one part of the adrenochrome derivative resulted in stable solutions and/or dry compositions containing high usable concentrations of the monosemicarbazone or the monooxide of adrenochrome. The use of sodium salicylate as a solubilizing agent was thought unique, however, since numerous experiments with chemically analogous materials proved unsuccessful.

In accordance with the present invention, however, the surprising discovery has been made that certain compounds that have a vitamin P-like action formed, together with adrenochrome derivatives, stable soluble combinations with a relatively low ratio of the aforementioned compound to the adrenochrome derivative. It has further been discovered that the novel compositions of the present invention may be prepared by dissolving the adrenochrome derivatives in an aqueous solution of compounds selected from the class consisting of the sodium salt of 4-methyl esculetin disulfate and hesperidin methyl chalcone, such solutions containing at least 1% by weight of the vitamin P active compound and at least 20 parts by weight of the soluble vitamin P active compound to each part of the adrenochrome derivatives.

Although it is not desired to be limited to this theory, it is believed that the combination of the adrenochrome derivative and the aforementioned compounds is in the nature of a complex since mere mixture of the adrenochrome derivative and the salt will not give the same results as a material derived from careful dehydration of a solution of the aforementioned compounds and the adrenochrome derivative.

The adrenochrome derivatives forming a valuable combination with the sodium salt of 4-methyl esculetin disulfate and hesperidin methyl chalcone include adrenochrome semicorbazone or the adrenochrome monooxime as well as the isonicotinic acid hydrazone of adrenochrome described in U.S. application Serial No. 397,273, filed December 9, 1953, now Patent No. 2,728,772.

In preparing the novel compositions of the present invention a solution of the sodium salt of 4-methyl esculetin disulfate or hesperidin methyl chalcone is first prepared. This may be saturated or may be of other practical concentration and such a solution contains in each case approximately 10% by weight of the compound.

The aforementioned solution of the sodium salt of 4-methyl esculetin disulfate will dissolve up to 4.6 mg. per cc. of adrenochrome semicarbazone, 1.8 mg. per cc. of adrenochrome monooxime and 1.3 mg. per cc. of the isonicotinic acid hydrazone of adrenochrome. Similarly, the aforementioned solution of hesperidin methyl chalcone will dissolve up to 3.8 mg. per cc. of adrenochrome monosemicarbazone, 2.96 mg. per cc. of adrenochrome monooxime and 4.0 mg. per cc. of the isonicotinic acid hydrazone of adrenochrome. There will therefore be present, in effective therapeutic solutions on dry combinations derived therefrom, at least about 20 parts by weight of the aforementioned compounds to each part of the adrenochrome derivative. The solution may be made at room temperature or with slight heating. The solutions may be diluted with water to any degree without precipitation or in the alternative more dilute solutions of the sodium salt of 4 methyl esculetin disulfate or hesperidin methyl chalcone may be utilized for dissolving the adrenochrome derivatives. If more dilute solutions are utilized, in general a higher proportion of the compound should be present. In general, it may be stated that solutions below 1% by weight of the sodium salt of 4 methyl esculetin disulfate or hesperidin methyl chalcone are not suitable or feasible for use. The solutions may also contain or have added thereto suitable amounts of substances customarily used in injectible compositions such as up to 2% of benzyl alcohol which serves to reduce pain at the site of injection.

After the solutions have been made of the adrenochrome derivative and the aforementioned salts they may be evaporated to dryness as by vacuum distillation at temperatures below 50°–60° C., or, preferably, by lyophlizing, i.e., rapid freezing and dehydration in the frozen state under a high vacuum. Still another method found suitable for dehydration of the solutions is rapid spray drying and for this purpose the solutions may be contacted in a conventional spray dryer with hot air at a temperature of approximately 400° F. The resultant powder is thereafter quickly removed from the spray drying chamber which may have a temperature of 200° F.

The solutions may be utilized as such for injection and are especially suitable in the form of aqueous solutions containing for each cc. of solution more than about 1 mg. of the adrenochrome monosemicarbazone, the adrenochrome monoxime and/or the adrenochrome isonicotinic acid hydrazone. The dry material may be utilized in the form of tablets, being formed into a tablet together with the usual excipients, fillers and/or adhesives.

The following specific examples serve to illustrate but are not intended to limit the present invention.

*Example I*

To 100 cc. of distilled water there was added 10 g. of the sodium salt of 4 methyl esculetin disulfate. The solution was heated and stirred. To the solution was then added .46 g. of adrenochrome semicarbazone. After stirring for a short period of time a clear solution resulted containing for each cc. of solution 4.6 mg. of adrenochrome semicarbazone. The solution was then sterilized and filled into sterile ampules under aseptic conditions. The solution was stable and could be injected in doses of 4.6 mg. or more of the adrenochrome semicarbazone intermuscularly without producing any necrosis or undesirable side reactions. The composition was particularly effective for the control of capillary type bleeding.

*Example II*

Following the conditions of Example I, except that .18 g. of adrenochrome monooxime was used, a stable solution was prepared containing 1.8 mg. per cc. of adrenochrome monoxime. The combination was similarly effective.

*Example III*

The procedure of Example I was repeated except that the solution of the sodium salt of 4 methyl esculetin disulfate was used to dissolve .13 g. of the isonicotinic acid hydrazone of adrenochrome. The result was a stable solution containing for each cc. 1.3 mg. of the hydrazone. The combination was also effective for the control of bleeding without undesirable effects.

*Example IV*

To 100 cc. of distilled water there was added 10 g. of the hesperidin methyl chalcone. The solution was heated and stirred. To the solution was then added .38 g. of adrenochrome semicarbazone. After stirring for a short period of time a clear solution resulted containing for each cc. of solution 3.8 mg. of adrenochrome semicarbazone. The solution was then sterilized and filled into sterile ampules under aseptic conditions. The solution was stable and could be injected in doses of 3.8 mg. or more of the adrenochrome semicarbazone intermuscularly without producing any necrosis or undesirable side reactions. The composition was particularly effective for the control of capillary type bleeding.

*Example V*

Following the conditions of Example IV, except that .296 g. of adrenochrome monooxime was used, a stable solution was prepared containing 2.96 mg. per cc. of adrenochrome monooxime. The combination was similarly effective.

*Example VI*

The procedure of Example IV was repeated except that the solution of the hesperidin methyl chalcone was used to dissolve .40 g. of the isonicotinic acid hydrazone of adrenochrome. The result was a stable solution containing for each cc. 4.0 mg. of the hydrazone. The combination was also effective for the control of bleeding without undesirable effects.

*Example VII*

Each of the solutions of Examples I to VI were quick frozen at a temperature of −10° C. The water content was then driven off at a pressure of 100 microns of mercury and a temperature of −20° C., to form a dry product. The dry products were then formed into tablets by adding thereto the usual excipients and fillers such as milk sugar, starch, etc., so that each tablet contained approximately 1 mg. of the adrenochrome derivative. The tablets proved effective for the control of capillary bleeding. As for example, a normal dose of from 3 to 5 tablets daily was sufficient to control various types of bleeding.

We claim:

1. A hemostatic composition comprising at least 20 parts by weight of a compound selected from the class consisting of the sodium salt of 4 methyl esculetin disulfate and hesperidin methyl chalcone and one part by weight of an adrenochrome derivative selected from the class consisting of adrenochrome monooxime, adrenochrome monosemicarbazone and adrenochrome isonicotinic acid hydrazone.

2. A hemostatic composition comprising at least 20 parts by weight of the sodium salt of 4 methyl esculetin disulfate and one part by weight of adrenochrome monooxime.

3. A hemostatic composition comprising at least 20 parts by weight of the sodium salt of 4 methyl esculetin disulfate and one part by weight of adrenochrome semicarbazone.

4. A hemostatic composition comprising at least 20 parts by weight of the sodium salt of 4 methyl esculetin disulfate and one part by weight of adrenochrome isonicotinic acid hydrazone.

5. A hemostatic composition comprising at least 20 parts by weight of hesperidin methyl chalcone and one part by weight of adrenochrome monooxime.

6. A hemostatic composition comprising at least 20 parts by weight of hesperidin methyl chalcone and one part by weight of adrenochrome semicarbazone.

7. A hemostatic composition comprising at least 20 parts by weight of hesperidin methyl chalcone and one part by weight of adrenochrome isonicotinic acid hydrazone.

8. A hemostatic composition comprising an aqueous solution of at least 20 parts by weight of a compound selected from the group consisting of the sodium salt of 4-methyl esculetin disulfate and hesperidin methyl chalcone and one part by weight of an adrenochrome derivative selected from the group consisting of adrenochrome monooxime, adrenochrome semicarbazone and adrenochrome isonicotinic acid hydrazone, said solution containing at least one mg. per cc. of the adrenochrome derivative.

9. A process for the production of a hemostatic composition comprising at least 20 parts by weight of a compound selected from the group consisting of the sodium salt of 4-methyl esculetin disulfate and hesperidin methyl chalcone and one part by weight of an adrenochrome derivative selected from the group consisting of adrenochrome monooxime, adrenochrome monosemicarbazone and adrenochrome isonicotinic acid hydrazone, which comprises preparing an aqueous solution of the compound having a concentration of at least 1% by weight and dissolving the adrenochrome derivative therein.

References Cited in the file of this patent

UNITED STATES PATENTS

| | | |
|---|---|---|
| 2,543,674 | Swayne | Feb. 27, 1951 |
| 2,581,850 | Fleischhacker | Jan. 8, 1952 |